United States Patent
Sarcar et al.

(10) Patent No.: US 9,465,406 B1
(45) Date of Patent: Oct. 11, 2016

(54) TIMERS AND METHODS THEREOF FOR COMPUTING DEVICES

(71) Applicant: QLOGIC, Corporation, Aliso Viejo, CA (US)

(72) Inventors: Kanoj Sarcar, Fremont, CA (US); Ralph B. Campbell, San Jose, CA (US); Daniel R. Pearson, Rocklin, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 321 days.

(21) Appl. No.: 14/067,815

(22) Filed: Oct. 30, 2013

(51) Int. Cl.
*G06F 1/14* (2006.01)
*G06F 1/04* (2006.01)
*G06F 1/00* (2006.01)
*H04L 1/18* (2006.01)
*H04L 29/06* (2006.01)

(52) U.S. Cl.
CPC .............. *G06F 1/14* (2013.01); *H04L 1/1848* (2013.01); *H04L 1/1851* (2013.01); *H04L 69/28* (2013.01)

(58) Field of Classification Search
None
See application file for complete search history.

(56) References Cited

U.S. PATENT DOCUMENTS

| | | | | |
|---|---|---|---|---|
| 5,577,237 A * | 11/1996 | Lin | ........................... | G06F 1/14 713/500 |
| 5,659,720 A * | 8/1997 | Fiacco | ....................... | G06F 1/14 713/502 |
| 6,505,304 B1 * | 1/2003 | Ozawa | ...................... | G06F 1/14 710/61 |
| 6,550,015 B1 * | 4/2003 | Craycraft | .................. | G06F 1/14 713/502 |
| 6,732,287 B1 * | 5/2004 | Siorek | ....................... | G06F 1/14 713/500 |
| 8,341,453 B2 * | 12/2012 | Shiraishi | ................. | H04L 69/28 713/502 |
| 2006/0031588 A1 * | 2/2006 | Sen | ......................... | H04L 69/16 709/248 |
| 2009/0164651 A1 * | 6/2009 | Ooshima | ................. | G06F 15/16 709/230 |
| 2010/0058102 A1 * | 3/2010 | Li | ......................... | H04L 1/1835 713/502 |

\* cited by examiner

*Primary Examiner* — Tanh Nguyen
(74) *Attorney, Agent, or Firm* — Klein, O'Neill & Singh, LLP

(57) ABSTRACT

Method and system for a device having a processor module for maintaining a connection with another device are provided. The device includes a timer module having a plurality of timers, where the resolution for each timer is maintained by one or more processor modules; and a timer state module that stores an indicator value for indicating a timer state. A timer is assigned to the connection and the processor module manages the resolution of the timer. The processor module sends a request to the timer module for arming the timer and the timer module sets the timer state as active in a first storage location maintained by the timer state module; and responds to the processor module after the timer is activated. The processor module uses the information in the response for requesting a disarm operation.

18 Claims, 6 Drawing Sheets

TIMERS AND METHODS THEREOF FOR COMPUTING DEVICES

TECHNICAL FIELD

The present embodiments relate to computing devices and associated methods thereof.

BACKGROUND

Computing devices use timers either in hardware, software or a combination thereof. The timers are typically used to trigger exception processing when certain expected events do not occur within an interval. A timer typically has a resolution that allows the timer to send a notification at certain intervals, for example, 5 milliseconds (ms), 10 ms and so forth.

As computing devices continue to improve and perform complex tasks, the use of timers also continue to increase. Often a computing device having a plurality of modules/components uses a plurality of timers' often with different resolutions. Managing the plurality of timers' becomes challenging due to the number of timers and the different resolution levels. It is desirable to have an efficient mechanism for handling timers with resolutions that may be associated with different events.

BRIEF DESCRIPTION OF THE DRAWINGS

The various present embodiments now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
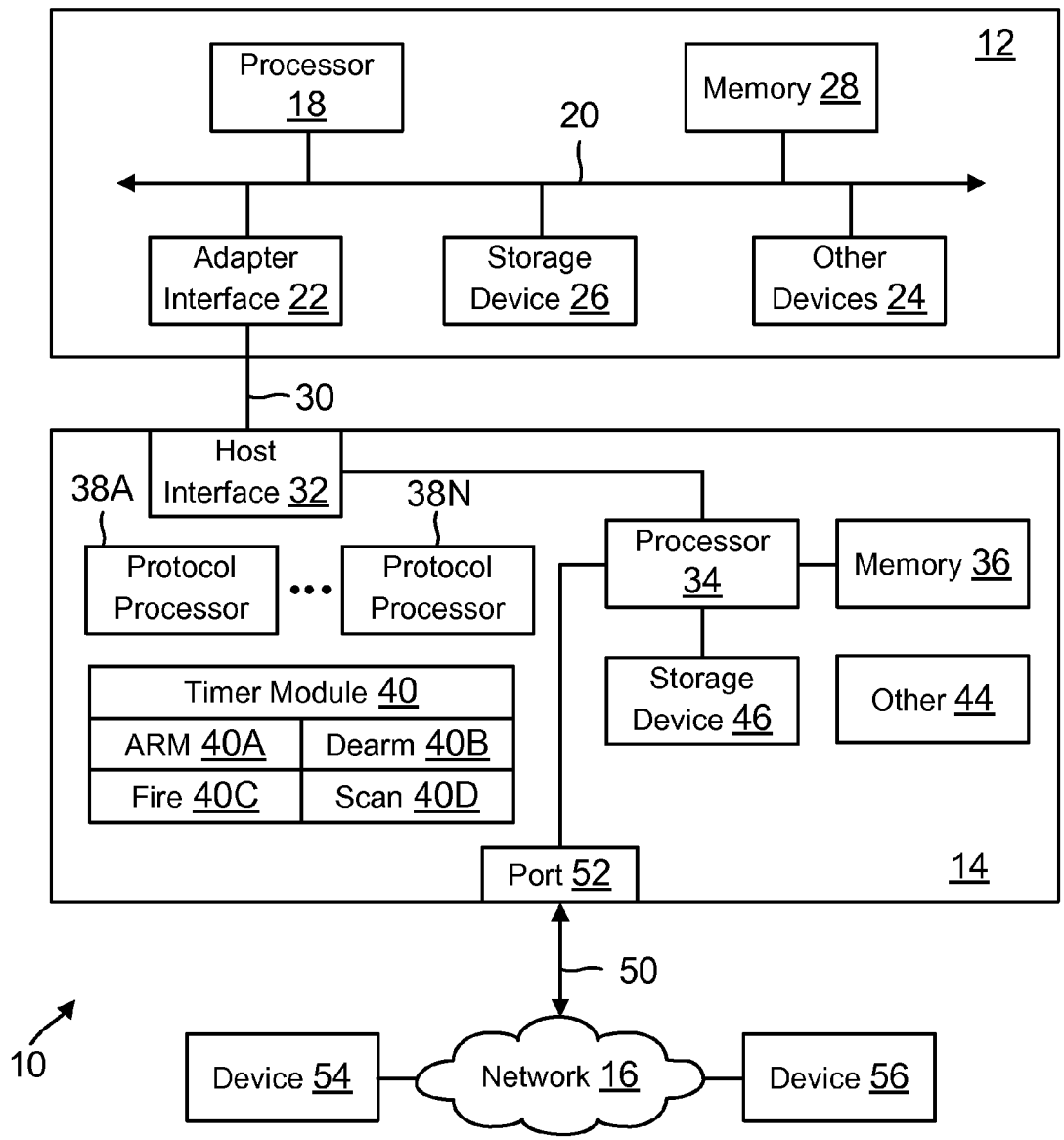
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms logic, module, component, system, and functionality represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process. The computer program product may also be readable by a computing system, and encoding a computer program of instructions for executing a computer process.

System 10:

FIG. 1A shows a block diagram of a system configured for use with the various embodiments described herein. System 10 includes a computing system 12 (may also be referred to as "host system 12") coupled to an adapter 14 that interfaces with a network 16 for communicating with other devices 54 and 56. The network 16 and devices 54 and 56 may include, for example, additional computing systems, servers, storage systems, storage devices, and other devices.

The computing system 12 may include one or more processors 18, also known as a hardware-based, central processing unit (CPU). The processor 18 executes computer-executable process steps out of a memory 28 and interfaces with an interconnect 20, which may also be referred to as a computer bus 20. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire®"), or any other kind of interconnect.

An adapter interface 22 enables computing system 12 to interface with adapter 14, as described below. The computing system 12 also includes other devices and interfaces 24, which may include a display device interface, a keyboard interface, a pointing device interface, etc. The details of these components are not germane to the inventive embodiments.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 interfaces with the computer bus 20 to provide processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, a link 30 and the adapter interface 22 couple adapter 14 to the computing system 12. The adapter 14 may be configured to send and receive network traffic complying with one or more protocols/standards, for example, Ethernet, Gigabit Ethernet, Transmission Control Protocol (TCP), Internet Protocol (IP), Fibre Channel (FC), Fibre Channel over Ethernet (FCOE), RoCEE, iSCSI and others.

The adapter 14 interfaces with the computing system 12 via a host interface 32 and link 30. In one embodiment, the host interface 32 may be a Peripheral Component Interconnect (PCI) Express interface coupled to a PCI Express link (for example, link 30).

Adapter 14 includes a processor 34 that executes firmware instructions out of memory 36 to control overall adapter 14 operations. The adapter 14 may also include storage 46, which may be for example non-volatile memory, such as flash memory, or any other device. The storage 46 may store executable instructions and operating parameters that can be used for controlling adapter operations.

The adapter 14 includes a port 52 that interfaces with a link 50 for sending and receiving information. In one embodiment, port 52 includes logic and circuitry for handling information that is sent and received by adapter 14. The structure of the logic and circuitry would depend on the link type and the protocol(s) used by adapter 14. Port 52 may include memory storage locations, referred to as memory buffers (not shown) to temporarily store information received from or transmitted to other network devices.

In one embodiment, information that is received by port 52 is processed by a receive module (not shown) and information that is transmitted by port 52 is handled by transmit module (not shown). Adapter 14 may have other modules shown as 44 and their details are not germane to the embodiments disclosed herein.

Adapter 14 may be configured to process various protocols. The modules for processing and performing protocol specific operations are shown as protocol processors 38A-38N. For example, protocol processor 38A may be used for processing Fibre Channel frames, while processor 38B may be used for processing iSCSI packets and so forth. It is noteworthy that although separate processors are being shown for one protocol, the embodiments disclosed herein are not limited such situations. The embodiments disclosed herein are applicable to an architecture where one processor or processor complex may be used to process more than one frame/packet type or execute other functions.

Processors 38A-38N may use a timer module 40 to track different operations, for example, to track different connections via port 52. The timer module may have an arm module 40A that is used to arm the timers i.e. set a timer so that it can start ticking. A disarm module 40B is used to de-activate timers. A fire module 40C is used to fire a timer when it has expired i.e. when it reaches a timer value. A scan module 40D is used to scan the timers to determine which are ready to be fired.

Figure 1B:
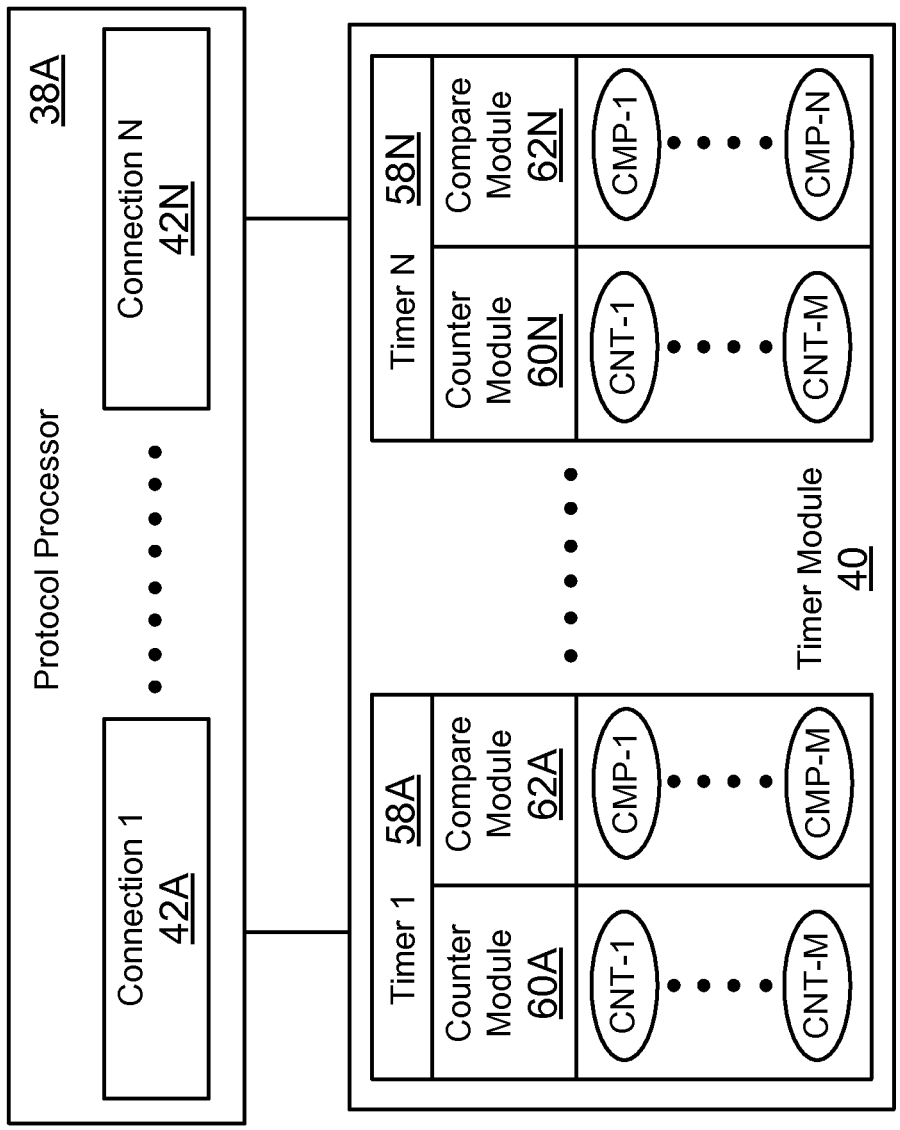
FIG. 1B shows an example of using a plurality of timers in a computing device.

FIG. 1B shows an example of processor 38A that maintains a plurality of connections (for example, TCP/IP connections) represented by 42A-42N. Each connection is associated with a timer 58A-58N having a plurality of resolutions. Each timer 58A-58N is associated with a counter module 60A-60N having a plurality of counters (CNT-1/CNT-M) that count based on different resolutions for the timer. Each timer also includes a compare module 62A-62N with a plurality of modules shown as CMP-1/CMP-M that compare the timer count to "fire" the timer.

The system shown in FIG. 1B has challenges. For example, different timers typically have different resolutions. This may require complex logic to track each timer for each connection. The problem is magnified when there are multiple processing blocks and each block is maintaining multiple connections using multiple timers operating at a plurality of resolutions. The embodiments disclosed herein provide an efficient system and process for handling a plurality of timers, as described below in detail with respect to FIGS. 1C-1D and the process flow diagrams of FIGS. 2A-2C.

Figure 1C:
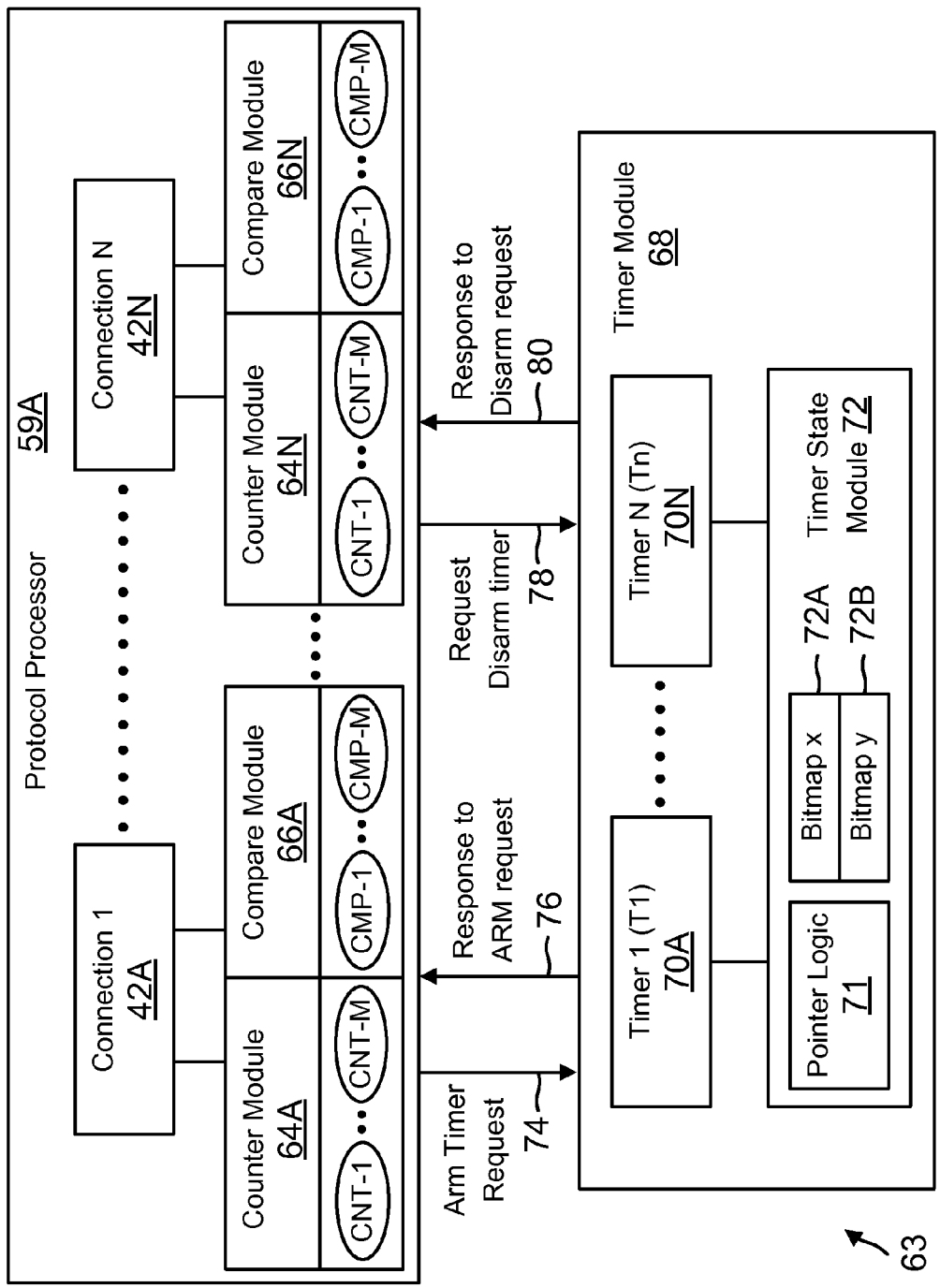
FIG. 1C shows a timer management system, according to one embodiment.

FIG. 1C shows a block diagram of a system 63, according to one embodiment. In system 63, instead of having the compare and counter hardware integrated with each timer as shown in FIG. 1B, compare and counter modules (i.e. 64A-64N and 66A-66N) are included with each protocol processor block 59A (similar to 38A-38N, FIG. 1A) that maintains the plurality of connections 42A-42N. The compare and counter modules may be implemented as computer executable instructions or software code. The counter module 64A and compare module 66A are implemented in the protocol processor module 59A to handle different resolutions, as described below in more detail. In one embodiment, the counter module 64A (and 64N) includes a plurality of counters (CNT-1/CNT-M) that may be used to track time based on different resolutions. The compare module 66A (and 66N) includes a plurality of modules (CMP-1/CMP-M) corresponding to the plurality of counters.

System 63 also includes a timer module 68 having a plurality of timers 70A-70N, each timer uniquely identified by a unique identifier (for example, T1, T2, . . . Tn). The timer identifier is known to the protocol processor 59A and may be stored as configuration information at a memory location or registers (for example, a configuration register (not shown)).

Timer module 68 includes a timer state module 72, according to one embodiment. The timer state module 72 may include a plurality of bitmap registers 72A/72B that are used to store bit values indicating the state of each timer indicating if the timer is active (i.e. the timer is counting) or inactive. In one embodiment, a bit value may be used to indicate the timer state.

In one embodiment, the protocol processor 59A sends a timer identifier to timer module 68 with a request (74) to arm a timer (for example, T1). When the timer T1 is armed by timer module 68, a response 76 is sent by the timer module 68 that identifies the timer that is armed and the bitmap where a bit indicating the timer state is set. At a later duration, the protocol processor 59A sends a request 78 to disarm timer T1 and the timer module 68 disarms T1 and then sends a response 80 to the protocol processor 59A.

Timer state module 72 further includes pointer logic 71 that is used to manage a plurality of pointers for scanning the various timers, as described below in detail with respect to FIG. 1D.

Figure 1D:
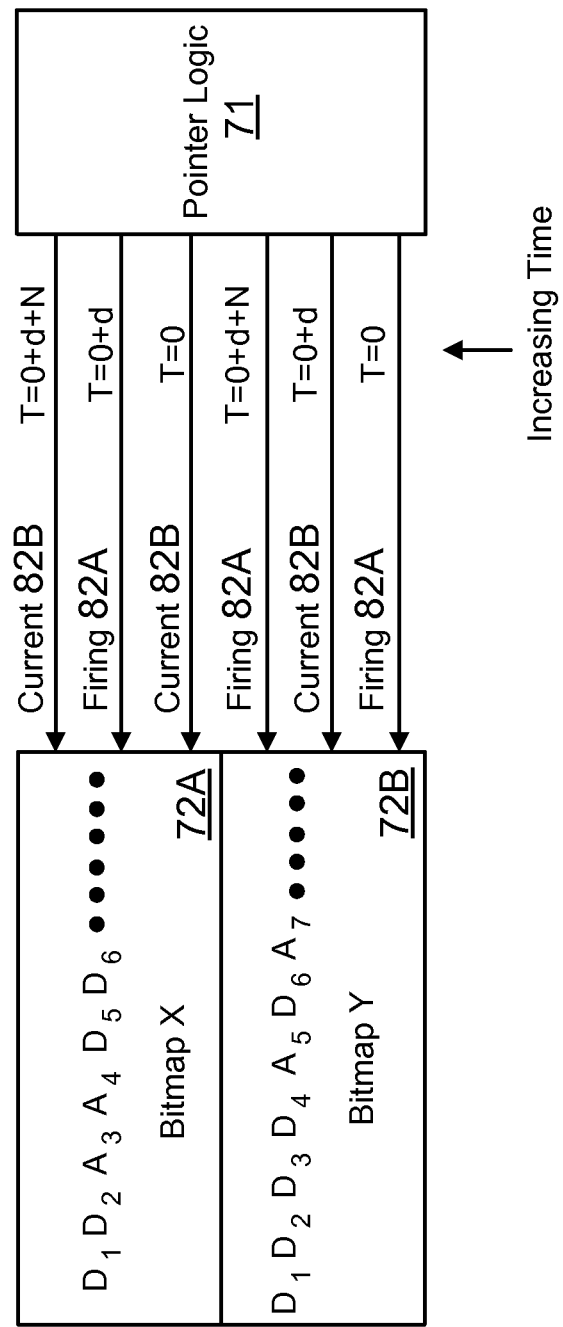
FIG. 1D shows an example of using the timer management system of FIG. 1C.

As shown in FIG. 1D, bitmaps 72A/72B are used to store a bit value indicating if a timer is active ("A") or de-active (i.e. inactive) ("D"). The bitmaps store a bit value associated with each timer (70A-70N) for indicating if a timer is active or inactive. Two pointers, firing pointer 82A and current pointer 82B managed by pointer logic 71 are used to determine which timers need to be fired at any given time. For example, at time t=0, firing pointer 82A points to bitmap 72B. This means that any timer that is active, for example, timer 5 (as indicated by bit A5) and timer 7 (as indicated by bit A7,) will be fired when the pointer logic scans the bitmap pointed to by firing pointer 82A. When the timers are fired, the bit values in bit map 72B are changed to "D" to indicate that the timers have been deactivated.

At the same time t=0, the current pointer 82B points to bitmap 72A that stores various bit values for each timer. These bit values indicate if a timer is active (shown by A, for example, A3, A4) or de-active, shown by D (for example, D1, D2 etc.).

A bitmap scan operation may begin at time T=0. Timers for which an A bit is set as pointed by the firing pointer 82A are fired. The scan operation may take a certain amount of time represented by "d". Then at time T=O+d as shown in FIG. 1D, the pointers are swapped such that the current timer 82B points to bitmap 72B, while the firing timer points to bitmap 72A. The above process repeats after a certain duration, for example, N ms later, i.e. at t=0+d+N; bitmaps are scanned again and the pointers are again swapped at t=0+d+N+d; and so forth. Here, N ms represents the accuracy of each timer (for example, 4 ms), while each timer's resolution may be 2*N ms (for example, 8 ms). It is noteworthy that the example of FIG. 1D shows two bitmaps, however the adaptive embodiments may use more than two bitmaps for improved accuracy.

Figure 2A:
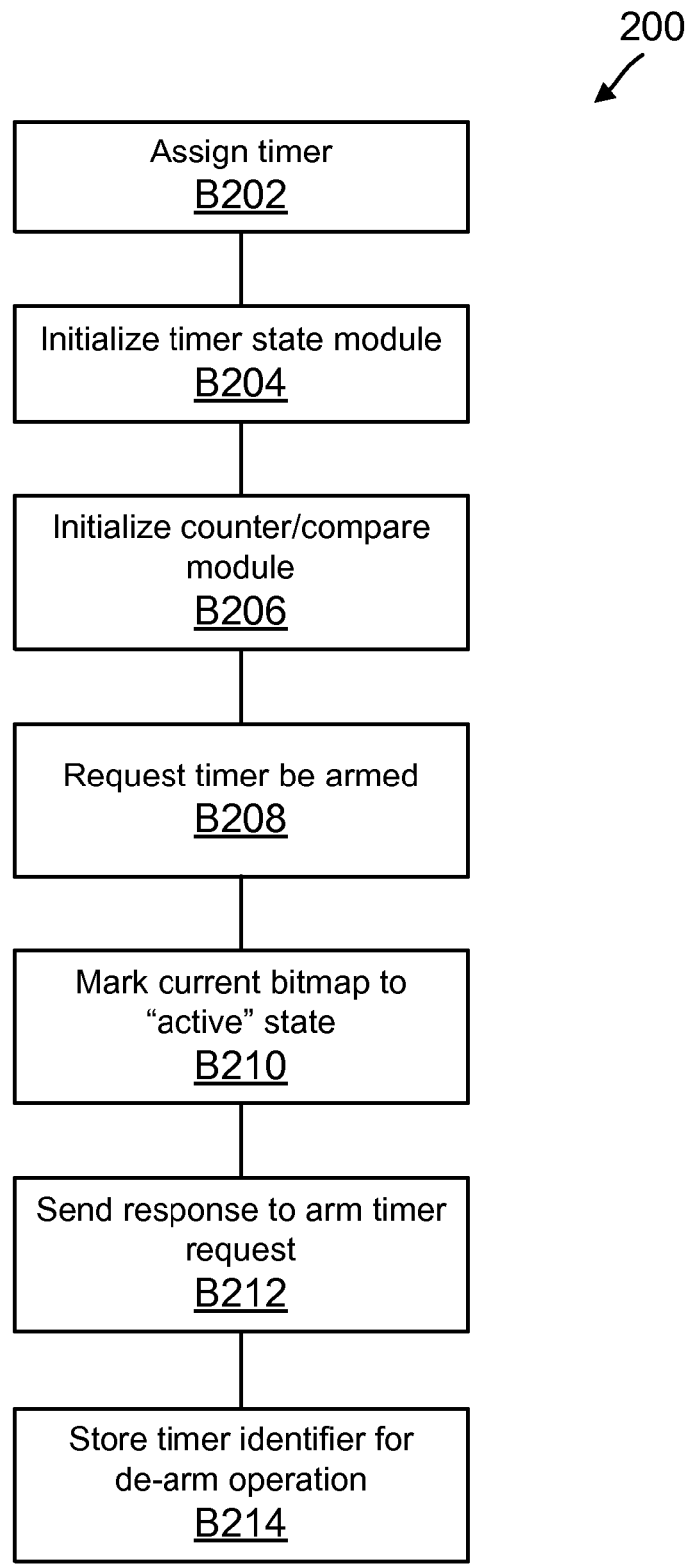
FIGS. 2A-2C show process flow diagrams, according to one embodiment.

FIG. 2A shows a process 200 for using the timer system 63 of FIGS. 1C/1D, according to one embodiment. The process begins in block B202, when a timer (identified by a timer-identifier) is assigned to a task/module/connection. For example, timer 70A may be assigned to connection 42A maintained by protocol processor 59A. The connection may be for sending or receiving information.

In block B204, the timer state at the timer state module 72 is also initialized. In block B206, the counter module 64A and the compare module 66A for the connection are also initialized. The counter module 64A and the compare module 66A are set based on a desired resolution for timer 70A and may have a plurality of counters and compare modules.

In block B208, the protocol processor 59A sends a timer-identifier to timer 70A with a request to arm the timer (74, FIG. 1C). Then in block B210, the timer module 70A, marks a bit associated with the identifier to indicate that the timer is active. The bit is marked in the bit map register that is marked as "current" using the current pointer 82B, described above with respect to FIG. 1D.

In block B212, the timer module 70A returns an armed-timer-identifier to protocol processor 59A, indicating that the timer is armed and is active (76, FIG. 1C). Timer module 70A creates the returned armed-timed-identifier using the input timer-identifier, and including an encoding for which bitmap (X or Y i.e. 72A or 72B in FIG. 1D) had the bit set as part of the arming operation.

In block B214, the protocol processor module 59A stores the armed-timer-identifier value as part of state for connection 42A at a storage location (not shown). The armed-timer-identifier value is then used for disarming the timer (dependent on requirements of protocol processing), as described below in FIG. 2B.

Figure 2B:
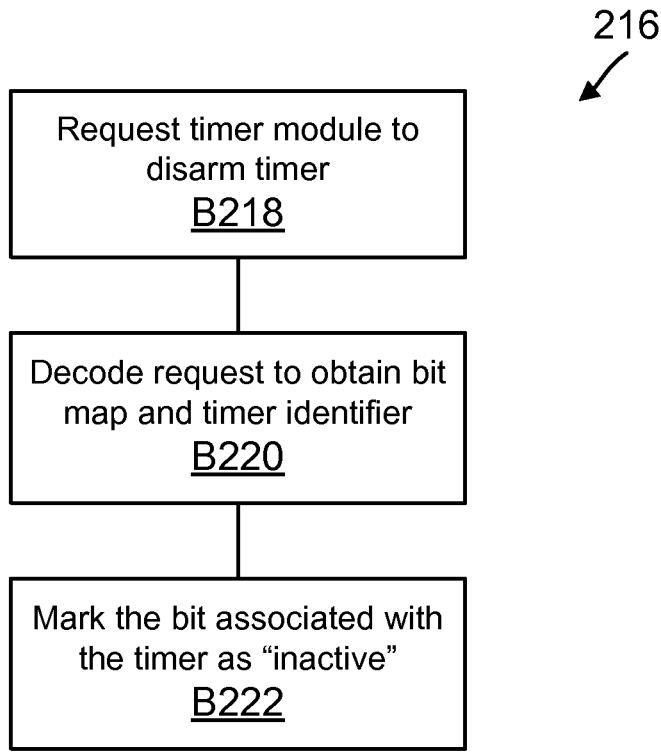

FIG. 2B shows a process 216 for disarming a timer, according to one embodiment. The process begins in block B218, when the protocol processor 59A sends request 78 to disarm a timer. The request includes an armed-timer-identifier that was stored in block B214 of FIG. 2A (and was thus previously returned by timer module 70).

In block B220, the timer module 70A decodes the request to obtain the timer-identifier and the bitmap register 72A or 72B. The bitmap register selected is the one which was pointed to by the "current" pointer in block B212 when the armed-timer-identifier value was returned to the protocol processor 59A. In block B222, the pointer logic 71 marks the bit for the timer in the identified bitmap as "inactive" and sends a response 80 to the disarm request.

Figure 2C:
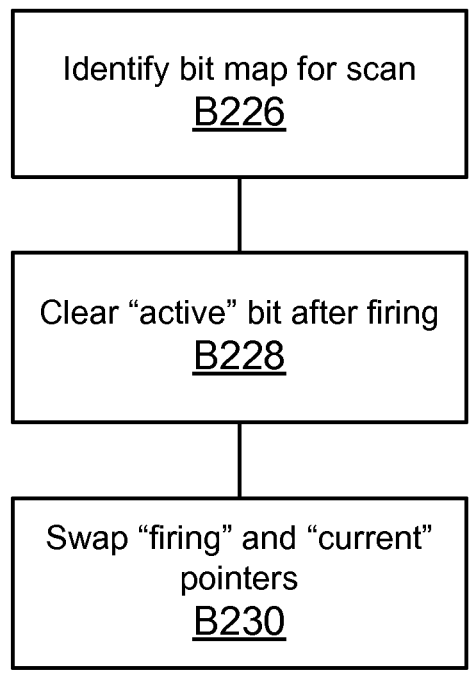

FIG. 2C shows a process 224 for firing a timer module, according to one embodiment. The process begins in block B226, when the "firing" pointer 82A is used to scan one of bitmaps 72A or 72B. As described above, pointers 82A and 82B alternate the scanning. After the bitmap is identified, in block B228, the timers whose bits are set as active are fired and the bit values are then set to "inactive". After the bitmap is scanned, the pointer 82A points to the other bitmap. For example, if bitmap 72A is scanned first, then after block B22, in block B230, pointer 82A points to bitmap 72B, this means that this bit map will be scanned next.

The embodiments disclosed herein have various advantages, for example, multiple timers don't have to track multiple resolutions. Instead the timer design is simplified where it maintains bit map registers storing the state of the timers. Two pointers are used for scanning the bitmaps to fire any timers that may need to be fired. The modules using the timers maintain the counter/compare modules for handling the resolutions for different timers.

Although the present disclosure has been described with reference to specific embodiments, these embodiments are illustrative only and not limiting. Many other applications and embodiments of the present invention will be apparent in light of this disclosure and the following claims. For example, the adaptive embodiments are not limited to just adapters, NICs and other networking devices and instead can be used in any environment using multiple processing devices and timers. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method, comprising:
assigning a timer from a plurality of timers maintained by a timer state module to a connection maintained by a processor module from among a plurality of processor modules of a device;
initializing a counter module and compare module included on the processor module and maintained by the processor module for a resolution for the timer;

wherein the plurality of processor modules include and maintain associated counter modules and compare modules for different connections for tracking time based on different resolutions;

initializing the timer state module for storing an indicator value indicating a timer state for the timer;

sending a request with an input-timer identifier for arming the timer, the request sent by the processor module to a timer module, the timer module including the plurality of timers and the timer state module;

setting the timer state for the timer as active in a first storage location of the timer state module;

responding to the processor module by the timer module after the timer is activated with an armed-timer identifier indicating that the timer is active, where the armed-timer identifier is based on the input-timer identifier and encoding for the first storage location;

storing the armed-timer identifier by the processor module;

using the armed-timer identifier by the processor module for requesting a disarm operation; and decoding the armed-timer identifier by the timer module to determine the first storage location for disarming the timer.

2. The method of claim 1, wherein the timer state module stores timer state information at the first storage location and a second storage location.

3. The method of claim 2, wherein the timer state module includes a pointer logic for managing a first pointer and a second pointer.

4. The method of claim 3, wherein the first pointer is a firing pointer that points to the first storage location and is used to determine which of the plurality of timers need to be fired based on status indicators for each of the plurality of timers.

5. The method of claim 3, wherein the second pointer points to the second storage location and is used to mark any active timers from among the plurality of timers.

6. The method of claim 5, wherein the second pointer points to the first storage location after the first pointer is used to fire any timers based on status indicators.

7. A device, comprising:

a processor module from among a plurality of processor modules for maintaining a connection with another device; wherein the plurality of processor modules include and maintain associated counter modules and compare modules for different connections for tracking time based on different resolutions; and a timer module having a plurality of timers and a timer state module, where the resolution for a timer is maintained by one or more processor modules using an associated counter module and compare module; wherein the timer state module stores an indicator value for indicating a timer state for the timer; wherein the timer is assigned to the connection and the processor module manages the resolution of the timer;

wherein the processor module sends a request with an input-timer identifier to the timer module for arming the timer and the timer module sets the timer state as active in a first storage location maintained by the timer state module; wherein the timer module responds to the processor module after the timer is activated with an armed-timer identifier that is based on the input-timer identifier and encoding for the first storage location; and wherein the processor module uses the armed-timer identifier for requesting a disarm operation and the timer module decodes the armed-timer identifier to determine the first storage location for disarming the timer.

8. The device of claim 7, wherein the timer state module stores timer state information at the first storage location and a second storage location.

9. The device of claim 8, wherein the timer state module includes a pointer logic for managing a first pointer and a second pointer.

10. The device of claim 9, wherein the first pointer is a firing pointer that points to the first storage location and is used to determine which of the plurality of timers need to be fired based on status indicators for each of the plurality of timers.

11. The device of claim 9, wherein the second pointer points to the second storage location and is used to mark any active timers from among the plurality of timers.

12. The device of claim 11, wherein the second pointer points to the first storage location after the first pointer is used to fire any timers based on status indicators.

13. A non-transitory, machine readable storage medium having stored thereon instructions for performing a method, comprising machine executable code which when executed by at least one machine, causes the machine to:

assign a timer from a plurality of timers maintained by a timer state module to a connection maintained by a processor module from among a plurality of processor modules of a device;

initialize a counter module and compare module included on the processor module and maintained by the processor module for a resolution for the timer: wherein the plurality of processor modules include and maintain associated counter modules and compare modules for different connections for tracking time based on different resolutions;

initialize the timer state module for storing an indicator value indicating a timer state for the timer;

send a request with an input-timer identifier for arming the timer, the request sent by the processor module to a timer module, the timer module including the plurality of timers and the timer state module;

set the timer state for the timer as active in a first storage location of the timer state module;

respond to the processor module by the timer module after the timer is activated with an armed-timer identifier indicating that the timer is active, where the armed-timer identifier is based on the input-timer identifier and encoding for the first storage location;

store the armed-timer identifier by the processor module;

use the armed-timer identifier by the processor module for requesting a disarm operation; and decode the armed-timer identifier by the timer module to determine the first storage location for disarming the timer.

14. The non-transitory, storage medium of claim 13, wherein the timer state module stores timer state information at the first storage location and a second storage location.

15. The non-transitory, storage medium of claim 14, wherein the timer state module includes a pointer logic for managing a first pointer and a second pointer.

16. The non-transitory, storage medium of claim 15, wherein the first pointer is a firing pointer that points to the first storage location and is used to determine which of the plurality of timers need to be fired based on status indicators for each of the plurality of timers.

17. The non-transitory, storage medium of claim 15, wherein the second pointer points to the second storage location and is used to mark any active timers from among the plurality of timers.

18. The non-transitory, storage medium of claim 17, wherein the second pointer points to the first storage location after the first pointer is used to fire any timers based on status indicators.

* * * * *

UNITED STATES PATENT AND TRADEMARK OFFICE
CERTIFICATE OF CORRECTION

PATENT NO. : 9,465,406 B1
APPLICATION NO. : 14/067815
DATED : October 11, 2016
INVENTOR(S) : Sarcar et al.

It is certified that error appears in the above-identified patent and that said Letters Patent is hereby corrected as shown below:

In the Specification

In Column 5, Line 27, delete "T=O+d" and insert -- T=0+d --, therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*